US011360208B2

(12) United States Patent
Mayer et al.

(10) Patent No.: US 11,360,208 B2
(45) Date of Patent: Jun. 14, 2022

(54) SENSOR SYSTEM FOR A VEHICLE AND METHOD FOR OPERATING A SENSOR SYSTEM FOR A VEHICLE

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 16/665,219

(22) Filed: Oct. 28, 2019

(65) Prior Publication Data

US 2020/0166633 A1    May 28, 2020

(30) Foreign Application Priority Data

Nov. 22, 2018   (DE) .......................... 102018220011.4

(51) Int. Cl.
*G01S 13/87* (2006.01)
*G01S 13/931* (2020.01)

(52) U.S. Cl.
CPC ............ *G01S 13/878* (2013.01); *G01S 13/87* (2013.01); *G01S 13/931* (2013.01)

(58) Field of Classification Search
CPC .................................. G01S 13/87; G01S 7/023
See application file for complete search history.

(56) References Cited

U.S. PATENT DOCUMENTS

| 2010/0097263 | A1* | 4/2010 | Vacanti | G01S 13/931 |
| | | | | 342/70 |
| 2012/0038504 | A1* | 2/2012 | Yu | G01S 3/74 |
| | | | | 342/81 |
| 2016/0097847 | A1* | 4/2016 | Loesch | G01S 13/931 |
| | | | | 342/156 |
| 2016/0240907 | A1* | 8/2016 | Haroun | G01S 13/931 |
| 2017/0018844 | A1* | 1/2017 | Mayer | H01Q 1/3283 |
| 2018/0372865 | A1* | 12/2018 | Seler | G01S 7/352 |

* cited by examiner

*Primary Examiner* — Marcus E Windrich
(74) *Attorney, Agent, or Firm* — Norton Rose Fulbright US LLP; Gerard Messina

(57) ABSTRACT

A sensor system for a vehicle, including a control unit, which is situated in the vehicle; multiple sensor units, which are situated on or in the vehicle and connected to the control unit, at least one of the sensor units being connected via a bidirectional connecting line for signal exchange or via a bidirectional connecting line and via a synchronization line to the control unit and being configured to receive a synchronization signal from the central control unit via the bidirectional connecting line or via the synchronization line to be operated by the control unit at a predefined point in time.

9 Claims, 2 Drawing Sheets

SENSOR SYSTEM FOR A VEHICLE AND METHOD FOR OPERATING A SENSOR SYSTEM FOR A VEHICLE

RELATED APPLICATION INFORMATION

The present application claims priority to and the benefit of German patent application no. 10 2018 220 011.4, which was filed in Germany on Nov. 22, 2018, the disclosure of which is incorporated herein by reference.

FIELD OF THE INVENTION

The present invention relates to a sensor system for a vehicle and to a method for operating a sensor system for a vehicle.

BACKGROUND INFORMATION

Present sensor systems for detecting surroundings of a vehicle, such as objects in an angular range, usually include antennas or sensors by which a measured signal is transmittable to a control unit in the vehicle; however a simultaneous, coupled or even coherent operation of multiple sensors does not appear to be known at present. In sensor systems for driver assistance systems, the focus is usually placed on inexpensive sensors. However, when it comes to highly autonomous driving, considerably higher demands are placed on the sensors. In addition, an increasing number of sensors are used in vehicles, a linking of their pieces of information being able to take place in a central control unit. At present, combinable functionalities of individual sensors by coupling the sensors at the clock level are already achievable, however these sensors are only coherent within the loop bandwidth. Usually, a fusion of the data in the central control unit presently still takes place in a prefiltered manner. However, some of the information, such as the very high angular separability due to the large physically possible aperture when using multiple radar sensors, is no longer used. In concepts which do without a coupling of the sensors, a signal output may suffer from phase noise. Previously, a wire-bound distribution of the high frequency signals at 77 GHz for the synchronization of the sensors appeared to be difficult.

Patent document US 2016/0240907 A1 discusses a sensor system for vehicles including a central control unit for the evaluation of sensors, the sensors being able to effectuate an analog to digital conversion and being able to enable an attendance check of objects.

SUMMARY OF THE INVENTION

The present invention creates a sensor system for a vehicle as described herein and a method for operating a sensor system for a vehicle as described herein.

Particular refinements are the subject matter of the further descriptions herein.

An aspect underlying the present invention is to provide a sensor system for a vehicle and a method for operating such a sensor system which is characterized by a coherent operation of sensors, and thereby by reduced phase noise. The sensor devices may advantageously be operated in the high frequency range and enable a high resolution surroundings monitoring of the vehicle.

By placing sensors at larger distances, e.g., on the front of the vehicle, this very large aperture may be utilized, e.g., to considerably increase the angle separability compared to today's sensor systems, and thereby completely meet the core requirements for sensors for highly automated comfort and safety functions.

Advantageously, only one high frequency synchronization line in the 76-81 GHz band is required/utilized for this purpose. A separate back transmission of the high frequency signal from each individual reception channel is advantageously not required since the down mixing and the analog to digital conversion may already take place in the individual sensors, and this signal may be transmitted to other sensors or the central control unit using standard protocols.

According to the present invention, the sensor system for a vehicle includes a control unit, which is situated in the vehicle, and multiple sensor units, which are situated on or in the vehicle and connected to the control unit, at least one of the sensor units being connected via a bidirectional connecting line for signal exchange or via a bidirectional connecting line and via a synchronization line to the control unit, and being configured to receive a synchronization signal from the central control unit via the bidirectional connecting line or via the synchronization line to be operated by the control unit at a predefined point in time.

The sensor system may advantageously be coherently operated in the high frequency range, for example, with 76-81 GHz and using multiple sensor units, whereby a high resolution and rapid surroundings monitoring of the vehicle may be made possible, as may become necessary for autonomous driving, for example. The control unit may be configured as a central control unit and advantageously be connected to all sensor units of the sensor system. At least one of these or advantageously multiple or all sensor units may be connected via respective bidirectional connecting lines to the control unit for a high frequency operation. The operation of the sensor units may be matched to the advantageously high frequency synchronization signal by an activation, advantageous for a coherent operation of the sensor units. The sensor units matched via the synchronization signal may thus be actively operated by the control unit at predetermined measuring points in time.

According to one specific embodiment of the sensor system, at least one of the sensor units includes an analog-to-digital converter device.

The synchronization line may represent an additional connection for the high frequency synchronization signal compared to the low frequency bidirectional data line. After the frequency has been down-mixed in the sensors, it may be sufficient to only transmit a low frequency response signal back to the control unit.

A signal processing into a digital signal may already take place in the respective sensor unit itself and be provided as digital measuring information directly to the control unit. In the case of a coherent and advantageously synchronized operation of multiple sensor units, it is thus possible for multiple already digitally converted signals to arrive at the control unit and to be evaluated more quickly, which may be advantageous for the autonomous driving, for example.

According to one specific embodiment of the sensor system, the at least one sensor unit connected via the bidirectional connecting line includes an interface for the bidirectional connecting line, which is configured for a signal transmission in the high frequency range.

According to one specific embodiment of the sensor system, the at least one sensor unit connected via the synchronization line includes an interface for the synchronization line, which is configured for a signal transmission in the high frequency range.

The interface may be a high frequency input, for example. This may be configured as a plug connection for the bidirectional connecting line and/or for the synchronization line, advantageously for a dielectric rod, and be attached to the housing of the sensor unit.

According to one specific embodiment of the sensor system, at least two sensor units are connected to the control unit, the control unit being configured to activate the at least two sensor units with the aid of the synchronization signal, which is in-phase on one of the two sensor units compared to the other sensor unit.

According to one specific embodiment of the sensor system, at least one sensor unit is connected via a cable connection to the control unit.

In addition to the sensor units activated in a high frequency manner and with the aid of the synchronization signal, conventional sensors may also be present and operated in the sensor system, which are able to transmit an analog or also a digital signal to the control unit with the aid of the synchronization signal, even outside the high frequency range and outside the clocking, and supply additional information to the synchronized sensor units. Conventional cable connections may suffice for these purposes, onto which no synchronization signal has to be impressed. The conventional sensor units may be simple antennas or signal transmitters or other sensor concepts.

According to one specific embodiment of the sensor system, the sensor units may be situated distributed over a horizontal and/or vertical angular range in an edge area of the vehicle.

According to one specific embodiment of the sensor system, the bidirectional connecting line includes a dielectric waveguide.

According to one specific embodiment of the sensor system, multiple of the sensor units, together with the control unit, form a coherently operable radar system.

According to the present invention, in the method for operating a sensor system for a vehicle, a sensor system according to the present invention is provided, at least one of the sensor units with a synchronization signal is activated by the control unit via the bidirectional connecting line or via the synchronization line at a predefined point in time, and an object and/or a distance from the object is/are ascertained coherently by multiple of the sensor units.

The method may advantageously also be characterized by the features and their advantages already mentioned in connection with the sensor system, and vice versa.

According to one embodiment of the method, a measuring signal generated by the sensor unit is converted in a sensor unit activated with the aid of the synchronization signal using an analog to digital converter device.

According to one embodiment of the method, at least two sensor units are activated simultaneously with the aid of the synchronization signal.

Further features and advantages of specific embodiments of the present invention are derived from the following description with respect to the accompanying drawings.

The present invention is described in greater detail hereafter based on the exemplary embodiment described in the schematic figures of the drawings.

In the figures, identical reference numerals denote identical or functionally equivalent elements.

DETAILED DESCRIPTION

Figure 1:
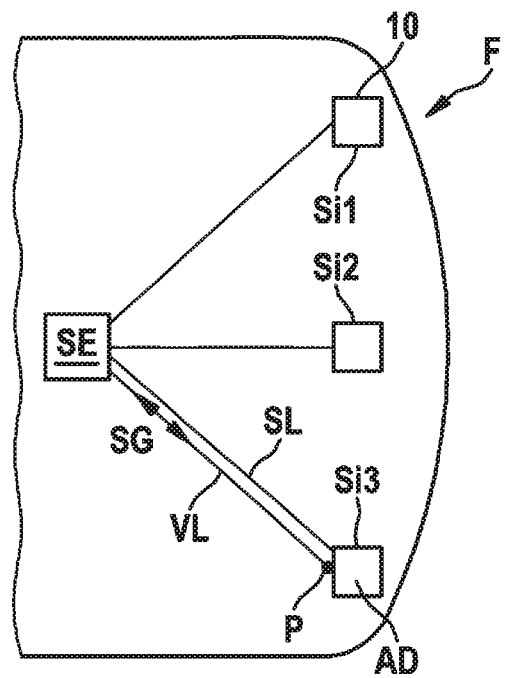
FIG. 1 shows a schematic arrangement of sensor units of a sensor system in a vehicle according to one exemplary embodiment of the present invention.

FIG. 1 shows a schematic arrangement of sensor units of a sensor system in a vehicle according to one exemplary embodiment of the present invention.

Sensor system 10 for a vehicle F includes a control unit SE, which is situated in vehicle F, and multiple sensor units Si1, Si2 and Si3, which are situated in vehicle F and connected to control unit SE, at least one of the sensor units Si1, Si2 or Si3 being connected via a bidirectional connecting line VL to control unit SE or via a bidirectional connecting line VL and via a synchronization line SL and being configured to receive a synchronization signal SG from control unit SE via bidirectional connecting line VL or via synchronization line SL, to be operated by control unit SE at a predefined point in time.

The sensor units which are activated with the aid of synchronization signal SG may be referred to as being operated in a high frequency manner.

The sensor units operated in a high frequency manner may each include an analog-to-digital converter AD and transmit an already converted signal directly to control unit SE. The sensor units may thus be operated in a high frequency manner, for example at 76 GHz to 81 GHz or at another frequency of at least 19 GHz (for example at 24 GHz or 76-81 GHz, or also at more than 100 GHz). The sensor unit(s) operated in a high frequency manner, such as Si3, may include an interface P for synchronization signal SG, which may be connected to bidirectional connecting line VL or to synchronization line SL, i.e., advantageously to a dielectric conductor. In addition to a simple sensor element or elements or an antenna or antennas, such a sensor unit Si3 operated in a high frequency manner may thus also include interface P and analog-to-digital converter AD. If multiple sensor units are configured for such a synchronized operation, sensor system 10 may thus include multiple advantageously coherent transmitting and receiving channels. The sensor units together with connecting lines VL may represent a sensor group. A bidirectional connecting line VL may also be understood to mean that, in addition to the customary cable connection (digital line), a respective dielectric conductor may also run to the sensor unit as a synchronization line (for example, unidirectional) from control unit SE to the sensor unit. Instead of the dielectric conductor, a coaxial cable or hollow conductor may also serve as (include) bidirectional connecting line VL, it being possible for bidirectional connecting line VL to be configured for an operation with a signal transfer at 76 GHz-81 GHz. Such a sensor group may advantageously be operated coherently. As a result of the coherent operation, a resolution of an angular measurement or angular estimation in the vehicle surroundings may advantageously be improved. Usually, multiple autonomously operating sensors are situated in a vehicle, for example on the front and two at the corners. In conventional sensor systems, each sensor has only a limited and low angle separability. In the case of a coherent operation of a sensor group, in particular of multiple or all sensor units, which may also be in a high frequency manner, it is possible to achieve apertures, such as for the angle, in the meter range, whereby an angle separability may result which may be considerably less than one degree. The synchronization signal may also have 47 GHz, for example. The further sensor operation, in terms of its frequency, may differ from or be the same as the frequency of the synchronization signal.

Figure 2:
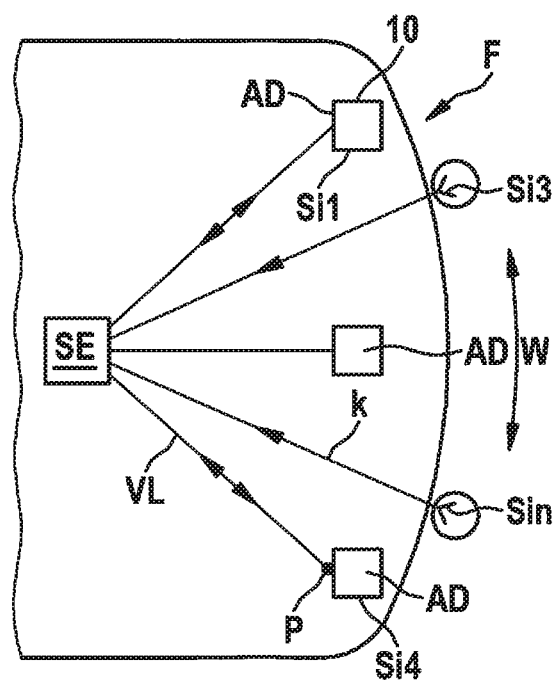
FIG. 2 shows a schematic arrangement of sensor units of a sensor system in a vehicle according to one further exemplary embodiment of the present invention.

FIG. 2 shows a schematic arrangement of sensor units of a sensor system in a vehicle according to one further exemplary embodiment of the present invention.

The arrangement from FIG. 2 corresponds to that from FIG. 1, it being possible for sensor units Si1, Si2 and Si4 to be situated in the vehicle and to be connected bidirectionally to control unit SE via connecting line VL. Sensor system 10 additionally also includes two conventional sensor units Si3, or also multiple, for example up to Sin, which may only be connected by a cable connection K to control unit SE (signal transmission only toward control unit SE). The two conventional sensor units Si3 and Sin may include simple antennas or sensors and transmit data in raw form, for example unconverted, to control unit SE, without these being controlled (clocked) by a synchronization signal. Sensor units Si1, Si2 and Si4 may cover an angular range W, horizontally or vertically (azimuthally or in the elevation plane), on vehicle F. To be able to improve the angular measuring resolution, it is possible that conventional sensor units Si3 and Sin are situated between sensor units Si1 Si2 and Si4 operated in a high frequency and synchronized manner. An analog-to-digital conversion of the signals of conventional signal units Si3 and Sin may take place in control unit SE. To cover an elevation plane, a sensor unit may be installed close to the ground or in the windshield, and another at the height of an emblem. Such an arrangement may considerably increase the elevation separability. Additionally, Si3 and Sin may also be only transmitting antennas, which may be connected directly to the high frequency line (connecting line or synchronization line or only cable connection).

If the digitally converted signals (baseband signals) of synchronized sensor units Si1, Si2, Si4 are transmitted to control unit SE, it is possible, instead of an individual sensor aperture, for example of 8 cm as one antenna side of a sensor unit, to achieve a sparse aperture (fewer necessary sensors across the sensing area), for example of 170 cm, when the individual sensors are coherent. If an aperture (angle) should be too sparse with the number of the synchronized sensor units, the measuring resolution could be expanded by additional synchronizable or conventionally operated sensor units, such as with Si3 and Sin.

The synchronized and the conventionally operated sensor units may then each cover different measuring areas as sub-groups.

Furthermore, it is possible to achieve a division of the target frequency (operation of the sensor units), for example with the aid of a mixer. Each individual sensor may downmix the synchronization signal to a lower frequency. In this way, an operation may be lowered by a division factor to a frequency of 19 GHz. For such an operation, a simpler connecting line could be used, in which case the signal transmission would also be simpler. A division here advantageously refers to a splitting (reduction, for example by corresponding known electronic components), for example a division by four.

Figure 3A:
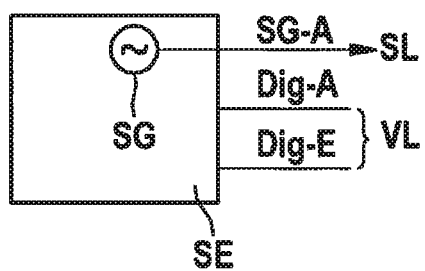
FIG. 3A shows a control unit including terminals for an output for a synchronization signal.

FIG. 3A shows a control unit including terminals for an output for a synchronization signal.

Control unit SE may generate an oscillating high frequency synchronization signal SG having a frequency of 47 GHz or higher, for example also 76 GHz-81 GHz. For the evaluation of signals which may be received from the control units, control unit SE may include a digital signal output Dig-A and a digital signal input Dig-E, which may be configured for a bidirectional signal flow. The control unit may furthermore also include an output SG-A for the synchronization signal. A bidirectional connecting line VL may be connected to the inputs and outputs Dig-A, Dig-E, and a synchronization line SL may be connected to SG-A.

Figure 3B:
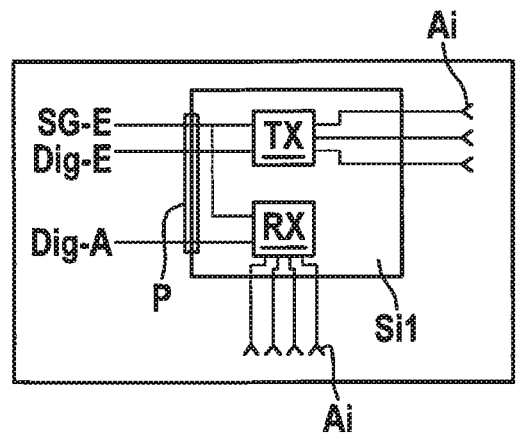
FIG. 3B shows a sensor unit including terminals for an input for a synchronization signal.

FIG. 3B shows a sensor unit including terminals for an input for a synchronization signal.

A sensor unit Si1, which is to be operated with a high frequency synchronization signal SG, may include an input for this signal SG-E, which may be present as an additional plug device in addition to the advantageously already present inputs and outputs Dig-E and Dig-A for the bidirectional signal transmission. After reception of the synchronization signal, sensor unit Si1 may carry out a sensor measurement (TX) via its sensor element (for example, via antenna Ai) and receive measuring signals (RX) and, after a digital conversion (not shown), forward them to digital output Dig-A. Digital input Dig-E may be used for control commands, for example.

Digital signal output Dig-A and digital signal input Dig-E may form an interface P. The input for synchronization signal SG-E may also be integrated therein, or may be present separately therefrom on the sensor unit.

Figure 4:
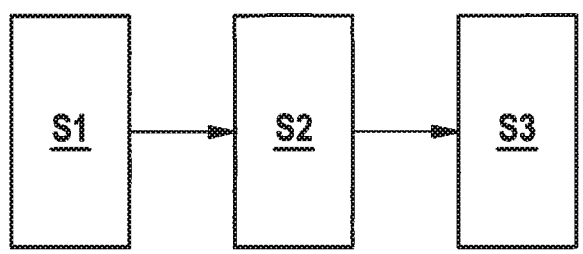
FIG. 4 shows a block diagram of the method steps according to the present invention.

FIG. 4 shows a block diagram of the method steps according to the present invention.

In the method for operating a sensor system for a vehicle, a provision S1 of a sensor system according to the present invention; an activation S2 of at least one of the sensor units by the control unit with the aid of a synchronization signal via the bidirectional connecting line at a predefined point in time; and an ascertainment S3 of an object and/or a distance from the object takes place coherently by multiple of the sensor units.

Although the present invention has been completely described above based on the exemplary embodiments, it is not limited thereto, but is modifiable in a variety of ways.

What is claimed is:

1. A sensor system for a vehicle, comprising:
   a control unit, which is situated in the vehicle; and
   multiple sensor units, which are situated on or in the vehicle and coupled to the control unit;
   wherein at least two of the sensor units, which form a sensor group, are coupled via a bidirectional connecting line for signal exchange and via a synchronization line to the control unit, and being configured to receive a synchronization signal from the control unit via the synchronization line to be operated by the control unit at a predefined point in time,
   wherein the synchronization line includes a dielectric conductor, or a coaxial cable, or a hollow conductor run from the control unit to one of the sensor units,
   wherein the sensor group is operated coherently, so that as a result of the coherent operation, a resolution of an angular measurement or an angular estimation in the vehicle surroundings is improved,
   wherein the coherent operation of the sensor group, in a high frequency manner, provides apertures in a meter range, so that an angle separability result is less than one degree,
   wherein the at least two of the sensor units connected via the bidirectional connecting line include an interface for the bidirectional connecting line, which is for a signal transmission in the high frequency range, wherein the at least two of the sensor units connected via the synchronization line includes an interface for the synchronization line, which is for a signal transmission in the high frequency range, wherein the at least two of the sensor units are connected to the control unit, the control unit being configured to activate the at least two sensor units with the synchronization signal, which is in-phase on one of the sensor units compared to the other sensor unit, and wherein a division of a target frequency, for operation of the sensor units, is provided with the aid of a mixer, so that each of the sensor units may down-mix the synchronization signal to a lower frequency.

2. The sensor system of claim 1, wherein at least one of the sensor units includes an analog-to-digital converter device.

3. The sensor system of claim 1, wherein at least one sensor unit is connected via a cable connection to the control unit.

4. The sensor system of claim 1, wherein the sensor units are situated distributed across a horizontal and/or vertical angular range in an edge area of the vehicle.

5. The sensor system of claim 1, wherein the bidirectional connecting line includes a dielectric waveguide.

6. The sensor system of claim 1, wherein multiple of the sensor units, together with the control unit, form a coherently operable radar system.

7. A method for operating a sensor system for a vehicle, the method comprising:

activating at least one of multiple sensor units with a synchronization signal by a control unit via a bidirectional connecting line or via a synchronization line at a predefined point in time, wherein the sensor system includes the control unit, which is situated in the vehicle, and the multiple sensor units, which are situated on or in the vehicle, wherein the sensor units are coupled to the control unit, at least one of the sensor units being coupled via the bidirectional connecting line for signal exchange and via the synchronization line to the control unit and being configured to receive the synchronization signal from the control unit via the synchronization line to be operated by the control unit at the predefined point in time, wherein the synchronization line includes a dielectric conductor, or a coaxial cable, or a hollow conductor run from the control unit to one of the sensor units, wherein the sensor group is operated coherently, so that as a result of the coherent operation, a resolution of an angular measurement or an angular estimation in the vehicle surroundings is improved, and wherein the coherent operation of the sensor group, in a high frequency manner, provides apertures in a meter range, so that an angle separability result which is less than one degree; and ascertaining an object and/or a distance from the object coherently by the sensor units degree;

wherein at least two of the sensor units connected via the bidirectional connecting line include an interface for the bidirectional connecting line, which is for a signal transmission in the high frequency range, wherein the at least two of the sensor units connected via the synchronization line includes an interface for the synchronization line, which is for a signal transmission in the high frequency range, wherein the at least two of the sensor units are connected to the control unit, the control unit being configured to activate the at least two of the sensor units with the synchronization signal, which is in-phase on one of the sensor units compared to the other sensor unit, and wherein a division of a target frequency, for operation of the sensor units, is provided with the aid of a mixer, so that each of the sensor units may down-mix the synchronization signal to a lower frequency.

8. The method of claim 7, wherein a measuring signal generated by the sensor unit is converted in a sensor unit activated with the synchronization signal using an analog-to-digital converter device.

9. The method of claim 8, wherein at least two sensor units are activated simultaneously with the synchronization signal.

* * * * *